J. SCHOONMAKER.
HORSE HITCHING DEVICE.

No. 170,023.  Patented Nov. 16, 1875.

UNITED STATES PATENT OFFICE

JOHN SCHOONMAKER, OF NEW YORK, N. Y.

IMPROVEMENT IN HORSE-HITCHING DEVICES.

Specification forming part of Letters Patent No. 170,023, dated November 16, 1875; application filed October 29, 1875.

*To all whom it may concern:*

Figure 1:
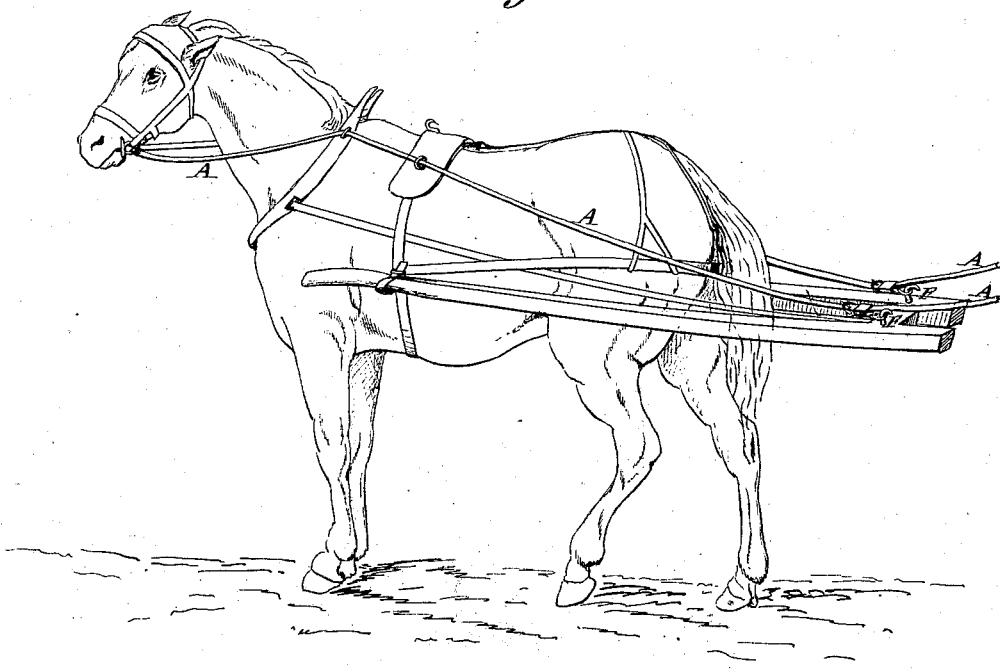
Figure 2:
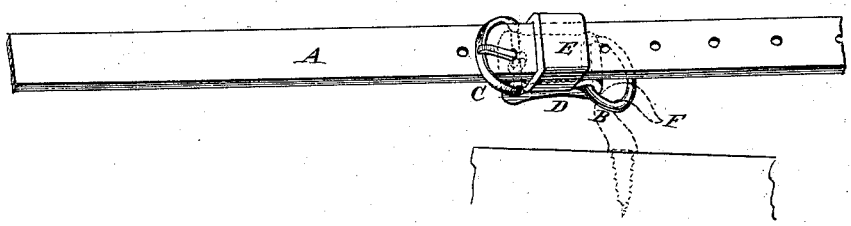

Be it known that I, JOHN SCHOONMAKER, of the city, county, and State of New York, have invented a new and Improved Horse-Hitching Device, of which the following is a specification:

Figure 1 is a view illustrating the use of my improved device, and Fig. 2 is a detail perspective view of a portion of a rein with the device applied to it.

Similar letters of reference indicate corresponding parts.

The object of this invention is to furnish an improved device for preventing horses, when left standing in the street, from running away, and which shall be simple in construction and convenient and reliable in use.

The invention consists in the combination of the ring, strap, keeper, and buckle, and the hook or hooks with the reins of a harness and with the shafts or body of a wagon, as hereinafter fully described.

A represents the reins of a harness, to each of which is attached a ring, B, by means of a buckle, C, a short strap, D, and a keeper, E, so that the device may be adjusted upon the reins as may be desired. The ring B is hooked upon a hook, F, attached to the rear part of the shafts or to the forward part of the wagon-body.

It will usually be most convenient to attach the hooks F to the forward part of the wagon-body; but when the wagon is so constructed that the forward wheels can be turned in beneath the body in cramping, the said hooks should be attached to the shafts.

The devices B C D E should be attached to the reins A in such position that when hooked upon the hooks F the traces and breeching may both be slack when the reins are taut, so that should the horse step forward the whole weight of the wagon will come upon his mouth, and will prevent him from moving forward.

The device may be applied to a plow, harrow, or any other draft to which a harnessed horse may be attached.

Having thus described my invention, I claim as new and desire to secure by Letters Patent—

The combination of the devices B C D E and the hooks F, with the reins A of a harness, and with the shafts or body of a wagon, substantially as herein shown and described.

JOHN SCHOONMAKER.

Witnesses:
JAMES T. GRAHAM,
T. B. MOSHER.